United States Patent
Meyer (10) Patent No.: US 9,611,132 B1
(45) Date of Patent: Apr. 4, 2017

(54) VORTEXING LIQUID DISPENSER AND METHOD OF USE

(71) Applicant: Taylor Meyer, Flagstaff, AZ (US)

(72) Inventor: Taylor Meyer, Flagstaff, AZ (US)

(73) Assignee: Vortex Hammock LLC, Flagstaff, AZ (US)

( * ) Notice: Subject to any disclaimer, the term of this patent is extended or adjusted under 35 U.S.C. 154(b) by 0 days.

(21) Appl. No.: 15/164,748

(22) Filed: May 25, 2016

Related U.S. Application Data (60) Provisional application No. 62/166,128, filed on May 26, 2015.

(51) Int. Cl.
  *B67D 3/00* (2006.01)
  *C02F 1/00* (2006.01)

(52) U.S. Cl.
  CPC ......... *B67D 3/0032* (2013.01); *B67D 3/0029* (2013.01); *B67D 3/0061* (2013.01); *C02F 1/005* (2013.01)

(58) Field of Classification Search
  CPC .. B67D 3/0032; B67D 3/0083; B67D 3/0029; A61M 5/1414; A47G 23/02; A47G 23/0241; B01F 15/00506; B01F 15/00512; B01F 2215/0072; C02F 1/005
  See application file for complete search history.

(56) References Cited

U.S. PATENT DOCUMENTS

| | | | |
|---|---|---|---|
| 2,084,243 A * | 6/1937 | Charles | A61J 9/0638 24/115 A |
| 3,074,243 A | 1/1963 | Tilden | |
| 3,366,360 A * | 1/1968 | Burke | A61M 5/1417 215/399 |
| 3,395,882 A * | 8/1968 | Marshall | A61M 5/1417 215/399 |
| 4,258,912 A | 3/1981 | Reighart | |
| 7,222,638 B1 | 5/2007 | Lopez et al. | |
| 7,905,728 B2 | 3/2011 | Piontek | |
| 8,951,422 B2 | 2/2015 | Mundheim et al. | |
| 2003/0070991 A1 | 4/2003 | Hatton | |
| 2003/0155386 A1 | 8/2003 | Lai | |
| 2006/0086253 A1 | 4/2006 | Bansal | |

(Continued)

OTHER PUBLICATIONS

Tyler Goldberg, "Creative Planters for Your Garden," Aug. 2013; http://blog.homespothq.com/2013/08/creative-planters-for-your-garden/7/.*

(Continued)

*Primary Examiner* — Daniel J Colilla
(74) *Attorney, Agent, or Firm* — Invention To Patent Services; Alex Hobson (57) ABSTRACT

A bottle hanger is configured to extend around a bottle and suspend the bottle for manually creating a vortex liquid for dispensing from the bottle. A bottle is configured with a dispenser that is configured on the bottom of the bottle when the bottle is in a dispense orientation, or hanging from a support within the bottle hanger. A user may rotate the bottle manually to cause the liquid within the bottle to rotate within the bottle until a vortex is formed. The user may then open the dispenser valve and dispense the vortexing liquid from the bottle. A bottle cover may be configured over a portion of the bottle to block light and reduce organism growth. A bottle cover assembly may have a translucent or transparent window for viewing the liquid within the bottle.

20 Claims, 13 Drawing Sheets

(56) References Cited

U.S. PATENT DOCUMENTS

2015/0003189 A1    1/2015  Werth et al.

OTHER PUBLICATIONS

Post: Paracord Water Bottle Holder Tutorial (Topic #771863); Jul. 2006; http://www.knifeforums.com/forums/showtopic.php?tid/771863/pid//.*
How to Make a Simple (Paracord) Bottle Wrap by TIAT; Aug. 2014; Youtube.com video; https://www.youtube.com/watch?v=kprl4GUBXBI.*

* cited by examiner

VORTEXING LIQUID DISPENSER AND METHOD OF USE

CROSS REFERENCE TO RELATED APPLICATIONS

This application claims the benefit of U.S. provisional patent application No. 62/166,128, filed on May 26, 2015 and entitled Vortexing Liquid Dispenser and Method of Use; the entirety of which is hereby incorporated by reference herein.

BACKGROUND OF THE INVENTION

Field of the Invention

The present invention relates to a liquid dispenser that creates a vortex of the liquid contained therein, and methods of using said dispenser Background Vortexing liquid is a relatively new method of producing structured water for consumption. There are mechanical devices available that may be used to produce a vortex and dispense water, however these devices are prone to breakdown and require power.

SUMMARY OF THE INVENTION

The invention is directed to a manually operated vortexing liquid dispenser that enables a user to quickly and easily create vortexing liquid within a hanging bottle for dispensing therefrom. A bottle hanger is configured to hold a bottle with the neck and/or the dispenser configured through a central opening in the bottle hanger, or crown opening. The bottle is secured to a support by one or more hanger loops that extend from the opposing hanger portion of the bottle hanger. In the dispensing orientation, with the bottle dispenser pointing down, a user can rotate the bottle about a vertical axis to swirl the liquid therein to create vortexing liquid. The user may then open the dispenser to dispense the vortexing liquid.

In an exemplary embodiment, a liquid vortex dispenser comprises a bottle having a body portion and a neck that truncates from the body portion to a neck opening. In a preferred embodiment, the bottle has a centrally located neck opening over the bottle, or the neck extends through a centrally located length axis of the bottle. The body portion of the bottle in most cases has a substantially uniform diameter and contains the bulk of liquid volume. A bottle may be any suitable size but relatively larger bottles may be preferred, as they store more liquid and provide convenient water supply for a longer period of time. A bottle having at least 7.5 liters of liquid holding capacity or more may be preferred for these reasons. A bottle may be a carboy type bottle with 7.5 liter capacity or more, 11 liter capacity or more, 15 liter capacity or more, 20 liter capacity or more, 25 liter capacity or more, and any range between and including the volumes provided. A bottle may have a body portion having a length of about 25 cm or more, about 40 cm or more, about 50 cm or more, about 75 cm or more, about 1 m or more and any range between and including the lengths provided. A bottle may have a diameter of about 15 cm or more, about 25 cm or more, about 40 cm or more, about 50 cm or more, about 75 cm or more and any range between and including the diameters provided. A bottle may have a circular shaped body portion or any other suitable shape. In an exemplary embodiment however, the neck of the bottle is centrally located over the body portion, which enables the neck to extend through the dispenser crown. A bottle may be made out of any number of materials, however glass is preferred as it will not leach out any plasticizers as may be the case with plastic bottles. In addition, plastic bottles that are subjected to sunlight may breakdown overtime, thereby leaching contaminates into the liquid contained within the bottle.

A bottle may have a hydrophilic inside surface. The hydrophilic surface may be created through any suitable treatment of coating known in the art, including plasma treatment, and/or the coating or application of polymer to the surface.

An exemplary bottle hanger comprises a plurality of elongated support members having attachment points. An elongated support member is a supple, pliable material having a length that is at least two times greater than a cross-dimension, or diameter in some cases. In an exemplary embodiment, the elongated support members are ropes, such as braided ropes that are tied or knotted together at the attachment points. In an alternative embodiment, the elongated support members comprise strap material that is substantially planar having a width that is much greater than the thickness. Strap material may be attached by stitching, rivets, adhesives, and the like. Any suitable means to attach the elongated support members may be used.

In an exemplary embodiment, a manually operated vortexing liquid dispenser comprises a dispenser retainer portion, a hanger portion and at least one retaining ring that extends around the body portion of the bottle. A dispenser retainer portion may comprise two or more dispenser trusses that extend down to a dispenser crown. The dispenser crown has a central opening for receiving the neck of the bottle. An exemplary hanger portion comprises two or more hanger trusses that extend up to the hanger loops. A bottle hanger may have one, two, three or more hanger loops. A bottle hanger may have a first retainer ring that is proximal to the base end of the bottle and a second retainer ring that is configured proximal the dispenser end of the bottle. The dispenser trusses and hanger trusses may extend from these two retainer rings and from opposite ends of the bottle hanger. Ring connectors extend between and connect the retainer rings together and extend along the length axis around the outside perimeter of the bottle.

An exemplary vortexing liquid dispenser enables a user to create and dispense a vortexing liquid by simply rotating or moving the bottle about a vertical axis that extends through a hanger location or point. A bottle may be oscillated back and forth and around the vertical axis to cause a liquid therein to swirl or rotate within the bottle. The liquid will begin to structure and vortex as the water continues to rotate within the bottle and about the length axis of the bottle. A centrally located depression will form in the top surface of the water as the water vortexes. A user may then simply open the dispenser to dispense the vortexing liquid.

In an exemplary embodiment, the base end of the bottle is oscillated or rotated about a vertical axis at an offset radius of rotation that is greater than an offset radius of rotation of the opposing dispensing end of the bottle. The base of the bottle, which is located above the dispensing end of the bottle when in a dispensing configuration, is rotated while the bottom end is held stationary or rotated less about the vertical axis. In an alternative embodiment, the dispenser-end of the bottle is rotated about the vertical axis at an offset radius of rotation while the base-end is rotated about said vertical axis at an offset radius of rotation that is substantially smaller than that of the dispenser-end.

In another method of use, a bottle may be configured in a bottle hanger with the base end of the bottle located in the dispenser portion of the bottle hanger. In other words, the bottle is flipped over from a dispensing configuration within the bottle hanger. In this configuration, the vortexing liquid dispenser can be used to manually carry the bottle by grabbing the hanger loops and using them as handles to carry the bottle. A handle may be coupled with the hanger loops to further assist carrying larger bottles whereby the handle may disperse the load on the person's hand.

A user may want to protect liquid, such as spring water, from exposure to light, as this may make any organisms grow more quickly and contaminate the liquid. A bottle may therefore be opaque or have a portion that is opaque. For example, a bottle may be opaque except for a portion that is translucent or transparent that enables a user to determine when the liquid inside begins to vortex from the manual manipulation of the bottle within the bottle hanger. A translucent portion may be a vertical bar or oval geometry, for example. In still another embodiment, a bottle cover may be configured over a portion of the bottle to block, or partially block light from passing through the cover into the bottle. A cover may be opaque and block light completely or may be translucent. In a preferred embodiment a cover is translucent, enabling a person to see when the liquid within the bottle begins to vortex. In still another embodiment, a cover, or covers, are configured such that a portion of the bottle is covered with a translucent cover. For example, a first translucent cover may be configured around the bottle and a second cover, having an opening or aperture therein may be configured over the first cover. The second cover may be translucent or opaque. In this embodiment, the liquid may be visible through the aperture in the second cover to enable a user to determine when the liquid starts to vortex, and the rest of the bottle, the portion covered by the two layers of bottle covers, may be more protected from sunlight or light. Finally, a cover may allow for light transmission into the bottle and the color of the cover may tint the light, such as red or blue, for example. Only allowing certain wavelengths, or color of light, to enter the bottle, and absorbing or reflecting the other light or color, may be desirable.

Concepts describing various phases of water are described in the book entitled, "The Fourth Phase of Water—Beyond Solid Liquid Vapor," by Gerald H. Pollack, copyright 2013 Ebner and Sons Publisher; the entirety of which is incorporated by reference herein. Specifically, chapter 3, "The Enigma of Interfacial Water," describes the interaction of water and hydrophilic surfaces.

The term vortexing, as used herein, means that the liquid water within the container is swirling or moving in a circumferential direction within the container. The liquid may form a depressed area in the center of the swirling liquid, much like a whirlpool. When a liquid in a container is vortexing, the bulk of the liquid within the container will move substantially circumferentially about a center axis, or about a linear axis of the container.

The summary of the invention is provided as a general introduction to some of the embodiments of the invention, and is not intended to limit the scope of the present invention. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Figure 1:
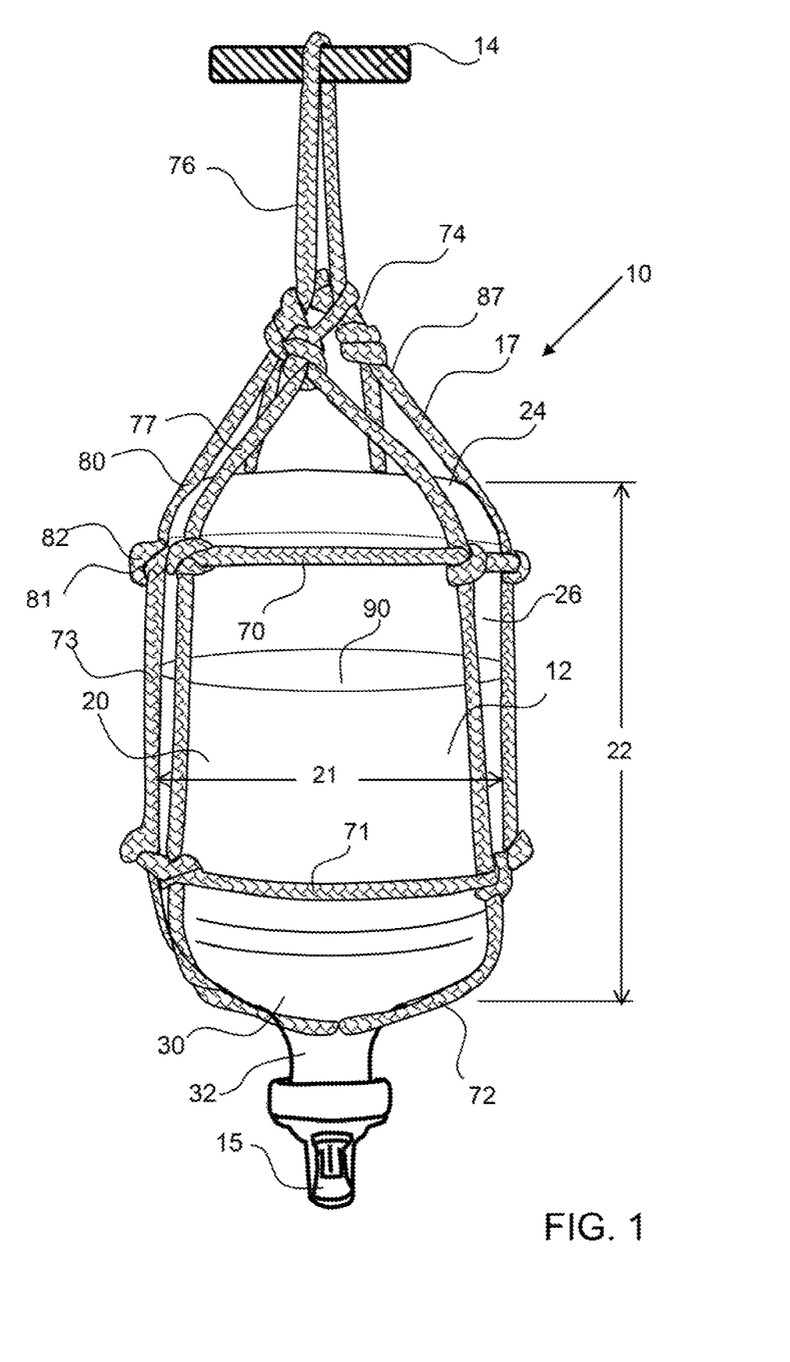
FIG. 1 shows a side view of an exemplary vortexing liquid dispenser configured with a bottle within the dispenser and hanging from a support.

As shown in FIG. 1, an exemplary vortexing liquid dispenser 10 is configured with a bottle 12 in the bottle hanger 17 and is hanging from a support 14. The dispenser-end 30 of the bottle is oriented down in the dispenser retainer portion 72 of the bottle hanger and the base-end 24 of the bottle is oriented up in the hanger portion 77 of the bottle hanger. A dispenser 15 is coupled with the neck 32 of the bottle 12 and extends out from the bottle hanger 17. The hanger portion 74 of the bottle hanger 12 comprises hanger trusses 7, and at least one hanger loop 76 that is retained by the support 14. The body portion 20 of the bottle 12 is retained by a first retainer ring 70 and a second retainer ring 71 that extend around the outer perimeter 26 of the bottle. Ring connectors 73 extend from the first to the second retainer rings. The bottle body portion 20, or the portion of the bottle below the neck that in most cases has a substantially uniform diameter 21, has a length 22. The bottle hanger 17 consists essentially of elongated support members 87 such as a rope 80, as shown, that is tied to form a plurality of knots 82 to connect and form the bottle hanger. Knots are just one form of an attachment point 81 of the elongated support members 87. Liquid 90 within the bottle 12 can be made to vortex by rotating the bottle and the vortexing liquid can then be dispensed from the dispenser.

Figure 2:
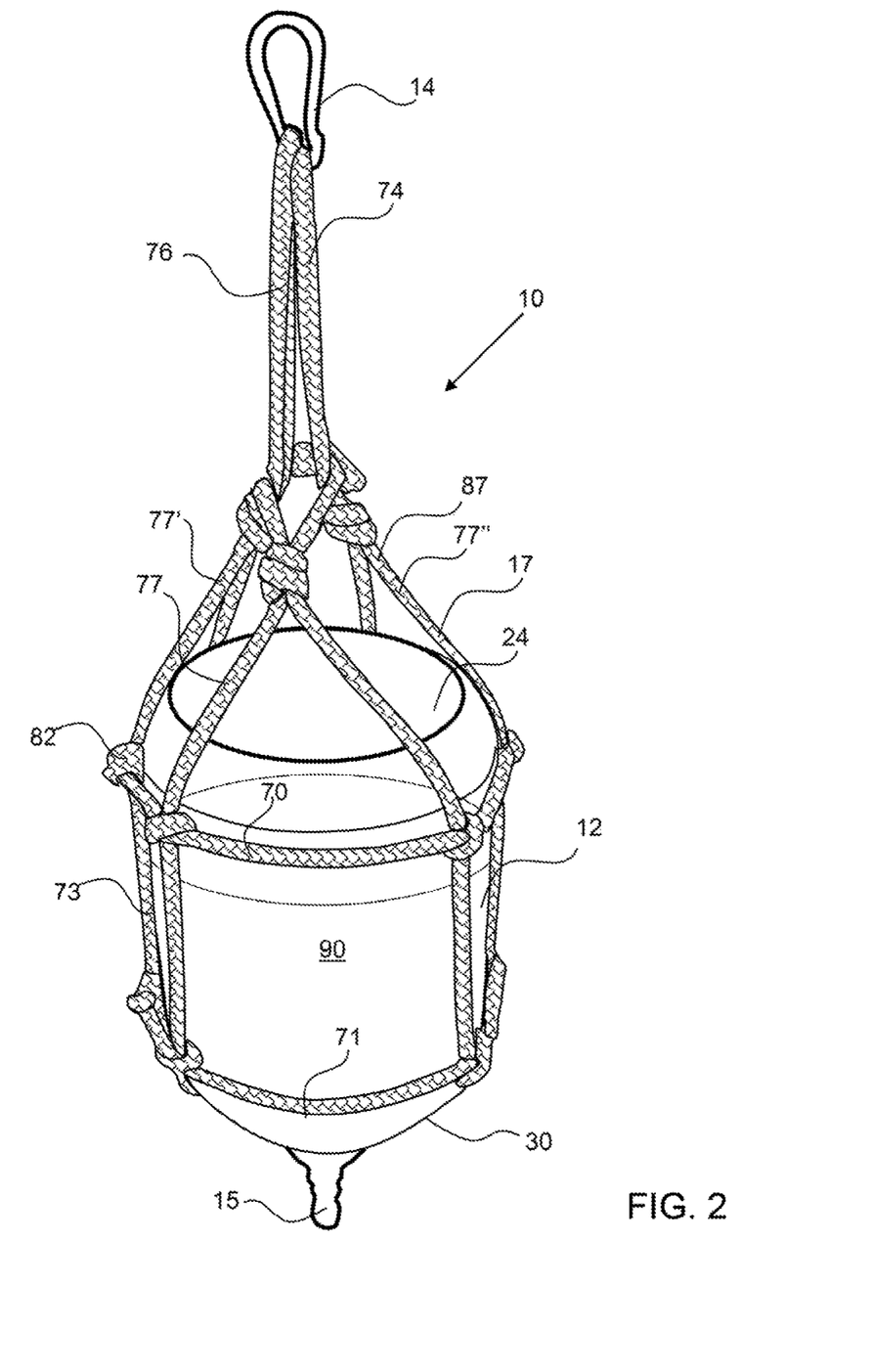
FIG. 2 shows a top-down perspective view of an exemplary vortexing liquid dispenser.

As shown in FIG. 2, an exemplary vortexing liquid dispenser 10 is configured in a dispensing orientation with the dispenser-end 30 of the bottle in a down orientation with the dispenser 15 extending out from the bottle hanger 17. The base-end 24 of the bottle is oriented up. The hanger portion 74 of the bottle hanger comprises three hanger trusses 77-77" that extend up from the second retainer ring 70 to the hanger loop 76. The hanger trusses have two connection points along the second retainer ring to form a generally triangular shape.

Figure 3:
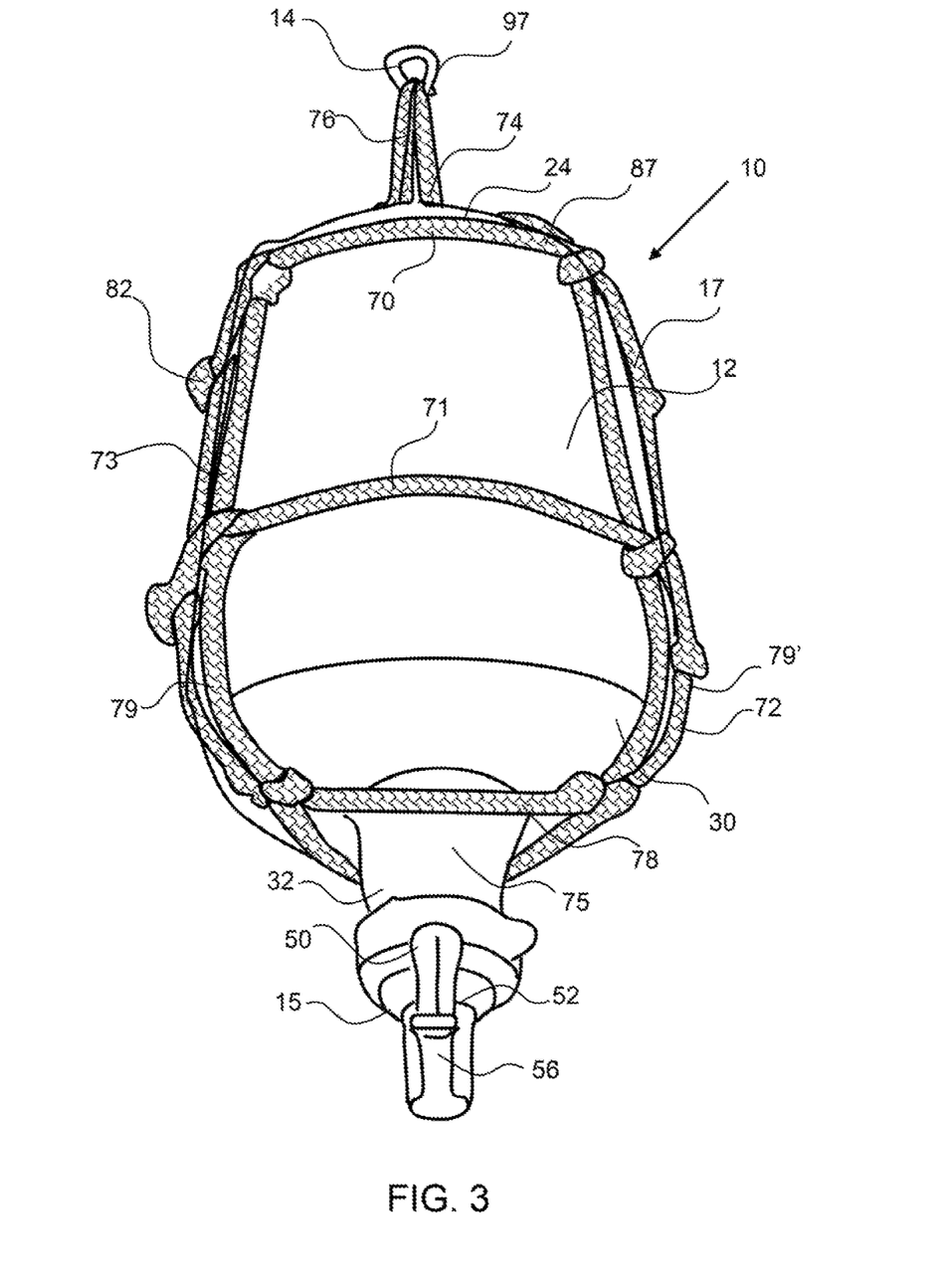
FIG. 3 shows a bottom-up perspective view of an exemplary vortexing liquid dispenser.

As shown in FIG. 3, an exemplary vortexing liquid dispenser 10 is configured in a dispensing orientation with the dispenser-end 30 of the bottle 12 in a down orientation with the dispenser 15 extending out from the bottle hanger 17. The base-end 24 of the bottle is oriented up or towards the hanger location 97. The dispenser retainer portion 72 of the bottle hanger 17 comprises three dispenser trusses 79-79" that extend from the first retainer ring 70 to the dispenser crown 78. The dispenser crown 78 forms an opening that is substantially centrally located to provide a crown opening 75 in the bottle hanger 17 for the neck 32 of the bottle. The dispenser 15 is coupled with the neck and comprises a dispenser actuator 50, a valve 52 and a dispenser opening 56 for the flow of liquid from the bottle 12.

Figure 4:
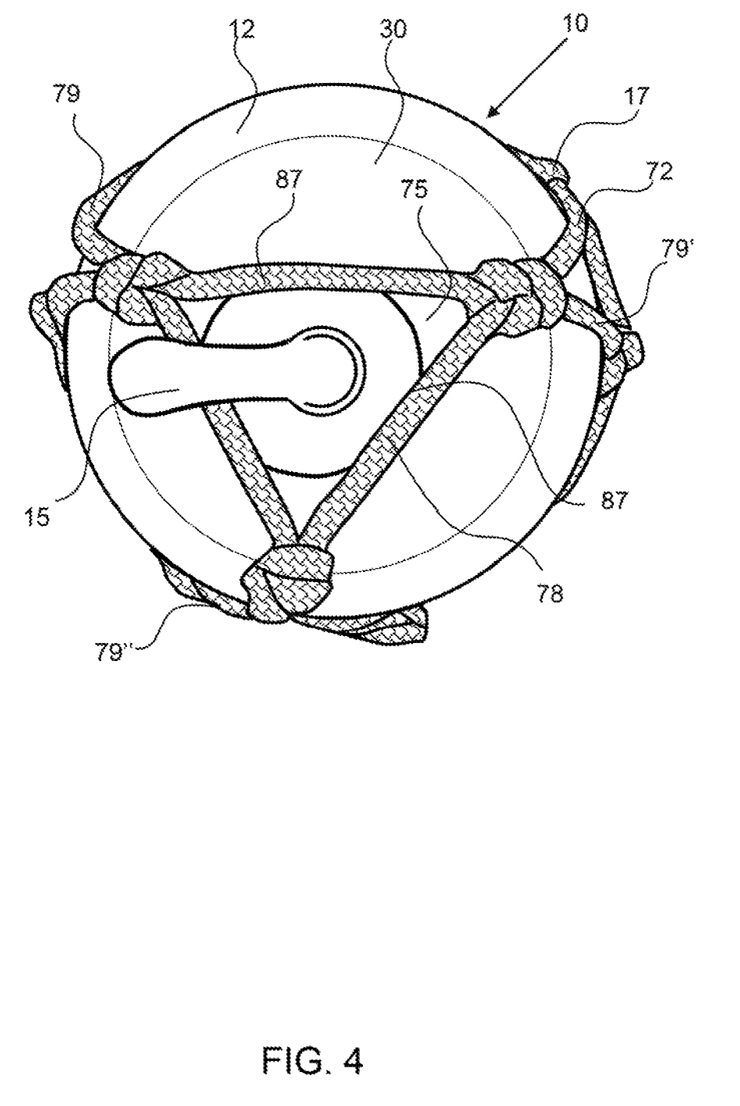
FIG. 4 shows a bottom view of an exemplary vortexing liquid dispenser with the bottle configured in a dispense orientation having the dispenser configured through the dispenser retainer portion of the bottle hanger.

As shown in FIG. 4, an exemplary vortexing liquid dispenser 10 is configured in a dispensing orientation with the dispenser-end 30 of the bottle 12 in a down orientation with the dispenser 15 extending out from the bottle hanger 17. The dispenser trusses 79-79" extend down to a dispenser crown 78 having a crown opening 75 that is substantially centrally located to provide support for the bottle 12. The dispenser crown extends around the neck of the bottle and the dispenser 15 attached thereto.

Figure 5:
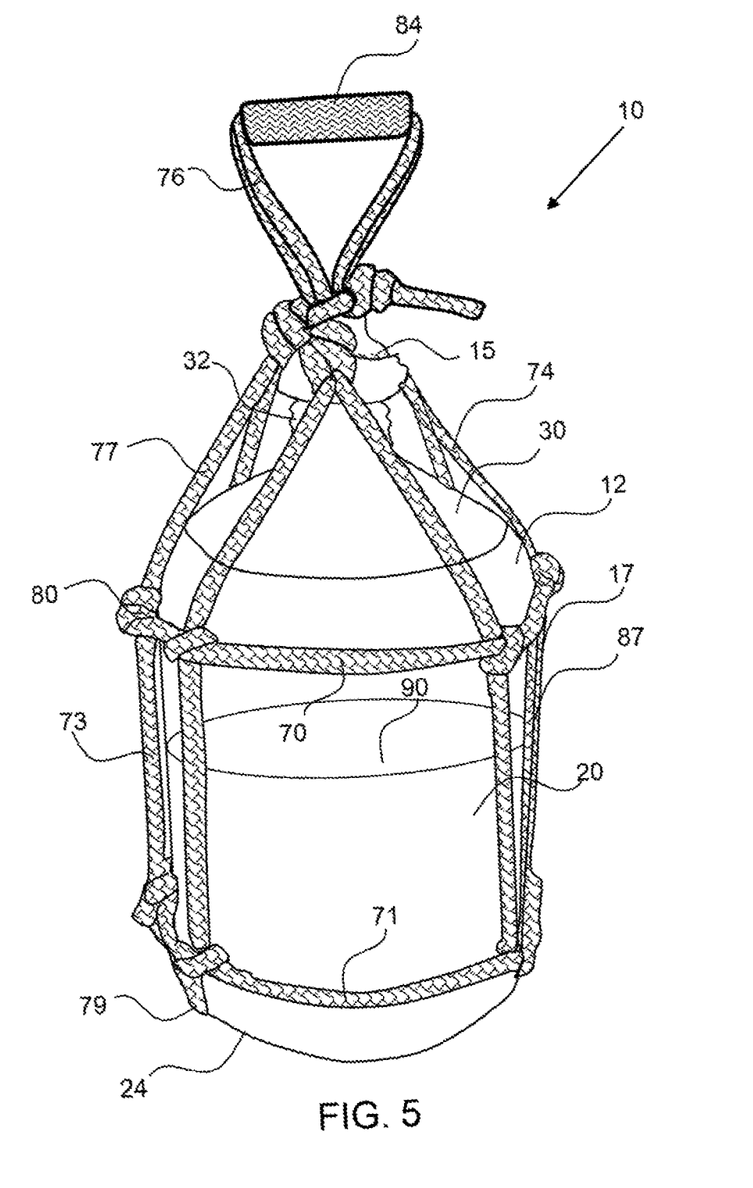
FIG. 5 shows a side view of an exemplary vortexing liquid dispenser with the bottle configured in a transport orientation having the dispenser configured up and into the hanger portion of the bottle hanger.

As shown in FIG. 5, an exemplary vortexing liquid dispenser 10 is configured in a transport orientation having the dispenser 15 configured up and into the hanger portion 74 of the bottle hanger 17. A handle 84 is coupled with the hanger loop 76 to provide a convenient means to transport the bottle. The vortexing liquid dispenser 10 with bottle 12 therein may be stored in this orientation.

Figure 6:
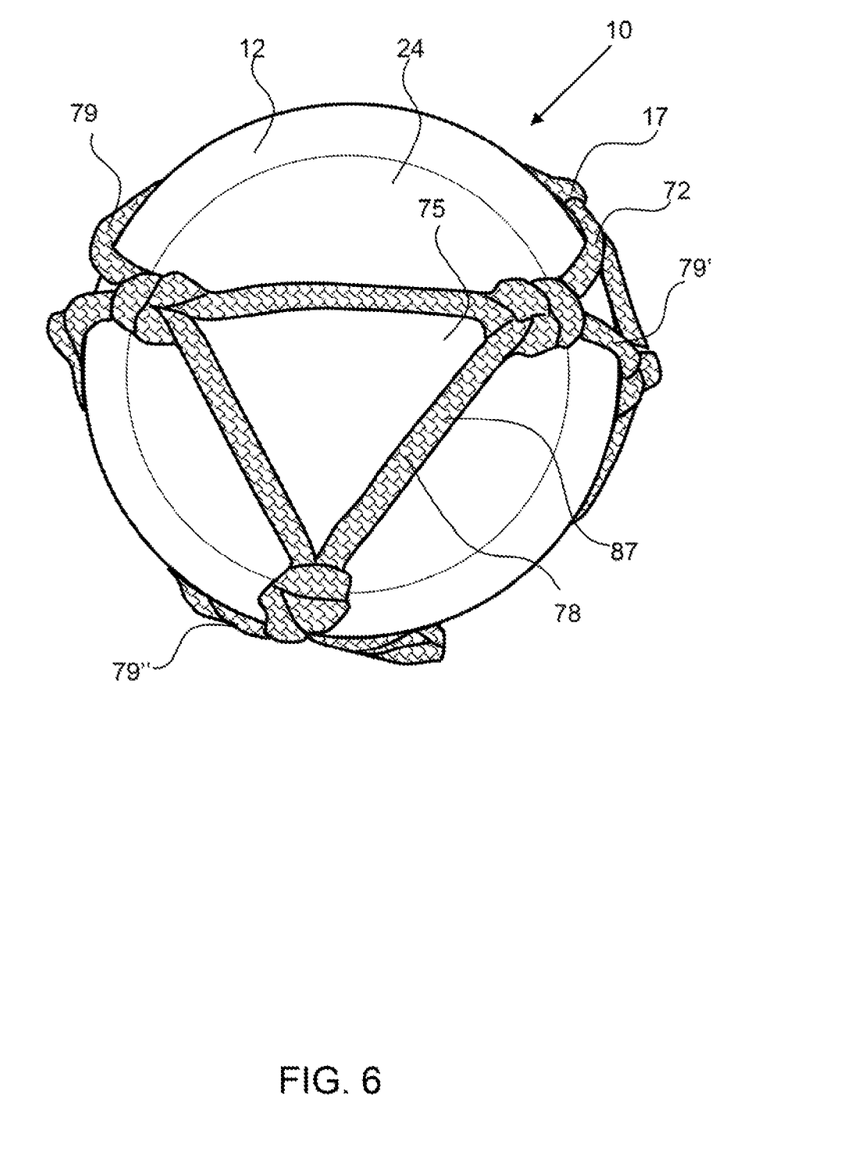
FIG. 6 shows a base-end or bottom view of an exemplary vortexing liquid dispenser in a transport orientation having the base-end of the bottle in the dispenser retainer portion of the bottle hanger.

As shown in FIG. 6, an exemplary vortexing liquid dispenser 10 is configured with the base-end 24 of the bottle 12 in the dispenser retainer portion 72 of the bottle hanger 12. The dispenser trusses 79-79" and dispenser crown 78 provide support for the base-end of the bottle.

Figure 7:
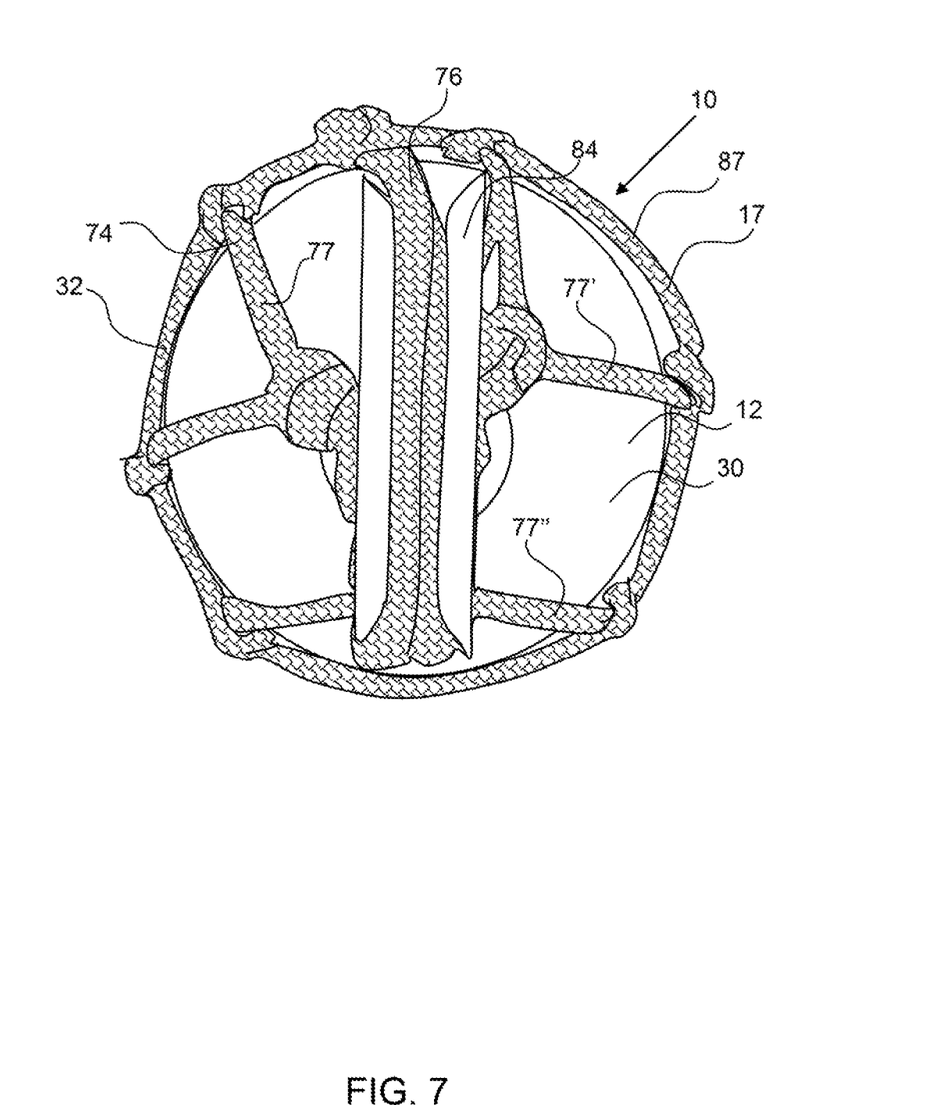
FIG. 7 shows a top-down view of an exemplary vortexing liquid dispenser in a transport orientation having the dispenser-end of the bottle in the hanger portion of the bottle hanger.

As shown in FIG. 7, an exemplary vortexing liquid dispenser 10 is configured in a transport orientation having the dispenser configured up and into the hanger portion 74 of the bottle hanger 17. A handle 84 is coupled with the hanger loop 76 to provide a convenient means to transport the bottle. The hanger loops 76 extend through the handle 84 and the handle has an open side for placement of the loops.

Figure 8:
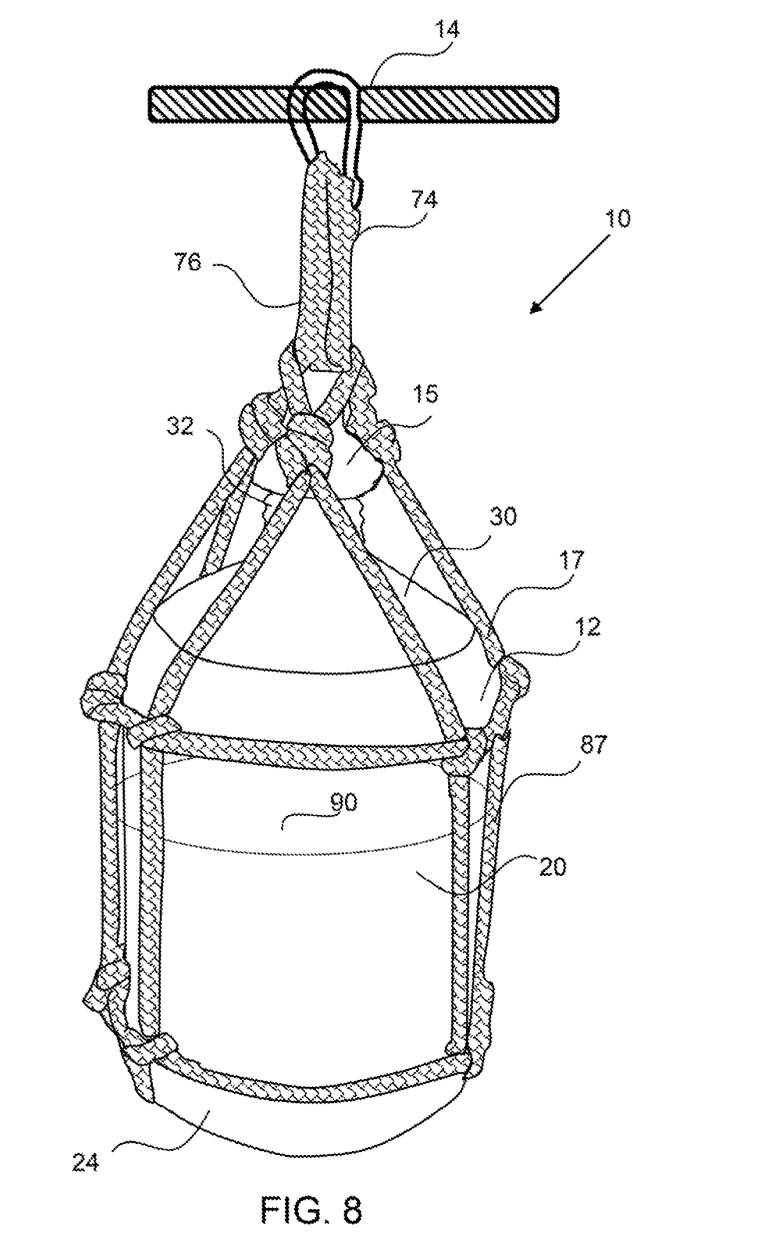
FIG. 8 shows a side view of an exemplary vortexing liquid dispenser in a transport orientation having the dispenser-end of the bottle in the hanger portion of the bottle hanger.

As shown in FIG. 8, an exemplary vortexing liquid dispenser 10 is configured with the dispenser 15 configured up and into the hanger portion 74 of the bottle hanger 17. A support 14 is coupled with the hanger loop 76 to provide a convenient means to store the bottle in a hanging orientation from the support.

Figure 9:
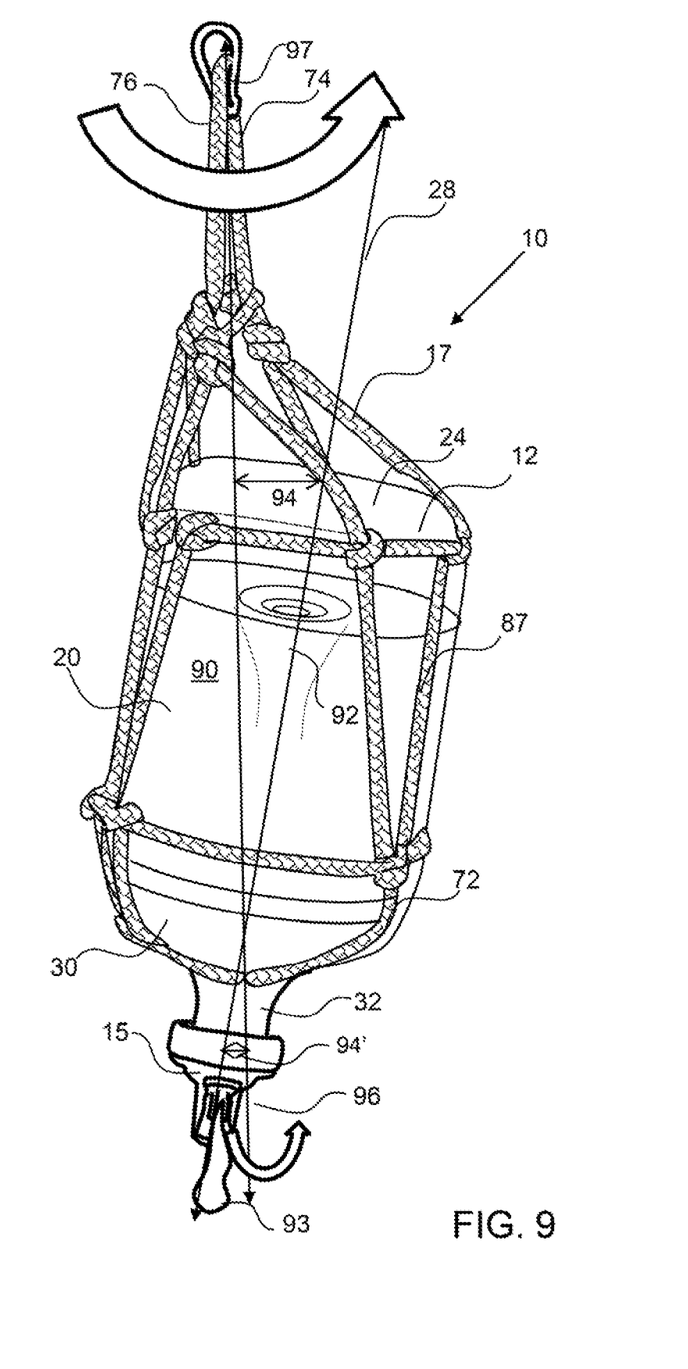
FIG. 9 shows a side view of an exemplary vortexing liquid dispenser with the bottle configured in a dispense orientation having the dispenser configured through the dispenser retainer portion of the bottle hanger and the base-end being rotated about a vertical line extending from the hanger location.

As shown in FIG. 9, an exemplary vortexing liquid dispenser 10 is in a dispense orientation having the dispenser 15 configured through the dispenser retainer portion 72 of the bottle hanger 17. The base-end 24 is being rotated about a vertical axis 96 extending from the hanger location 97. The length axis of the bottle 28 is at an offset angle to the vertical axis 96 as shown. To put it another way, the center point of the base is being rotated about the vertical axis at some offset radius of rotation 94 from the vertical axis and the dispenser end is being rotated about a much smaller offset radius of rotation 94' to the vertical axis or substantially being held stationary. The liquid 90 within the bottle is a vortexing liquid 92. Dispensed liquid 93, such as water, may be collected for drinking.

Figure 10:
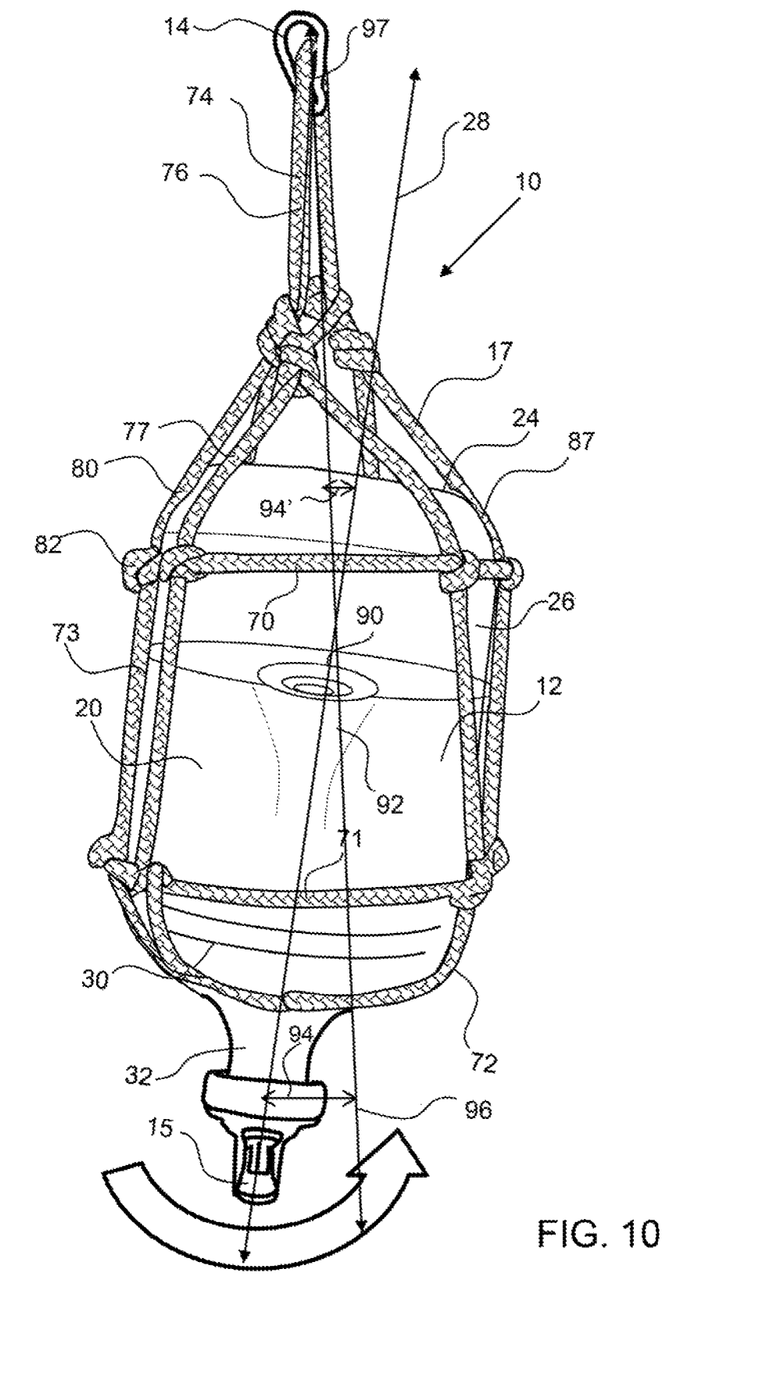
FIG. 10 shows a side view of an exemplary vortexing liquid dispenser with the bottle configured in a dispense orientation having the dispenser configured through the dispenser retainer portion of the bottle hanger and the dispenser-end being rotated about a vertical line extending from the hanger location.

As shown in FIG. 10, an exemplary vortexing liquid dispenser is in a dispense orientation having the dispenser 15 configured through the dispenser retainer portion 72 of the bottle hanger 17. The dispenser-end 30 is being rotated about a vertical axis 96 extending from the hanger location 97. The length axis of the bottle 28 is at an offset angle to the vertical axis 96 as shown. In this method of vortexing the liquid 90, the dispenser-end 30 of the bottle 12 is being rotated about the vertical axis at some offset radius of rotation 94 from the vertical axis and the base-end 24 is being rotated about a much smaller offset radius or rotation 94' to the vertical axis or substantially being held stationary.

Figures 11, 12:
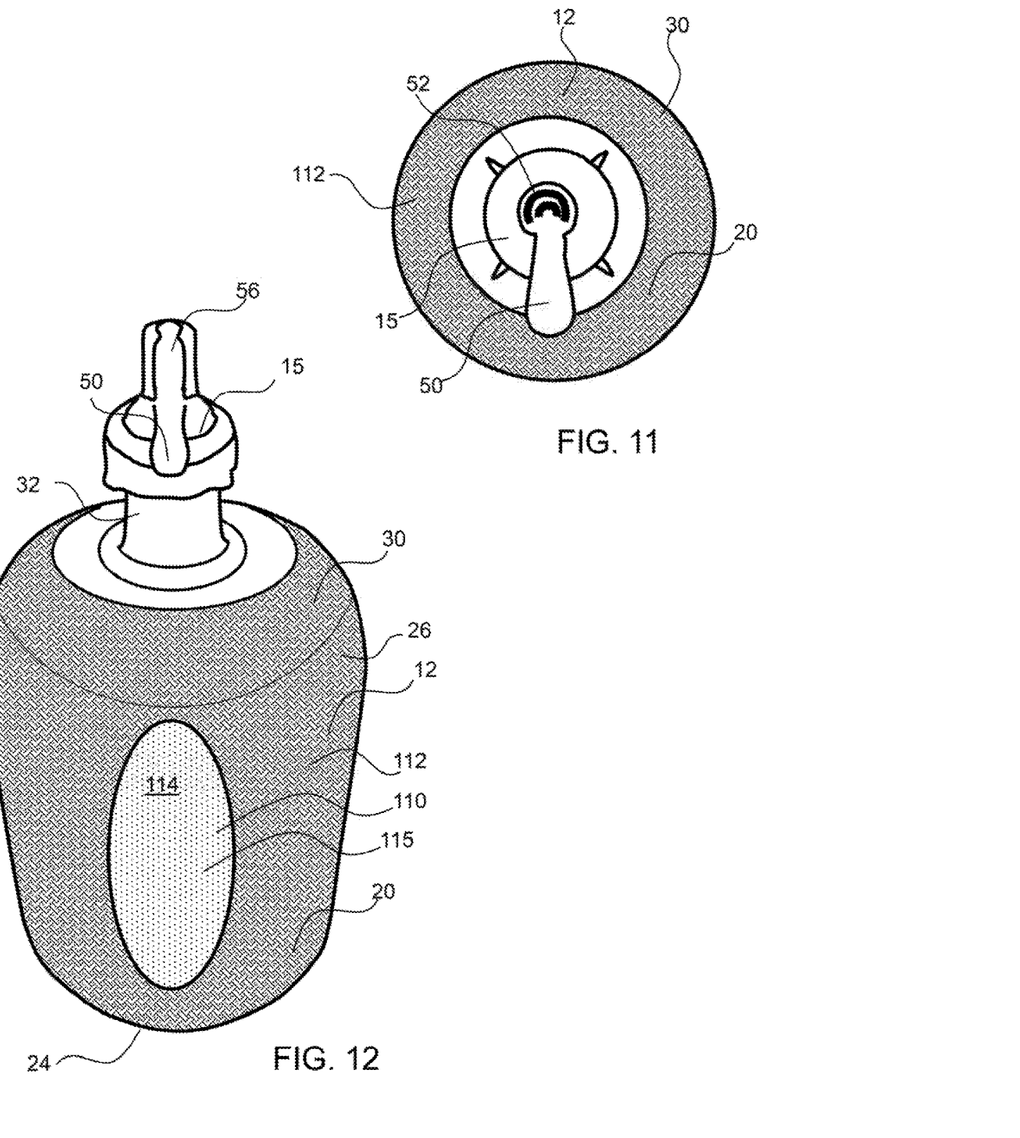
FIG. 11 shows a top-down perspective view of an exemplary bottle.
FIG. 12 shows a top view of an exemplary bottle.
Figure 13:
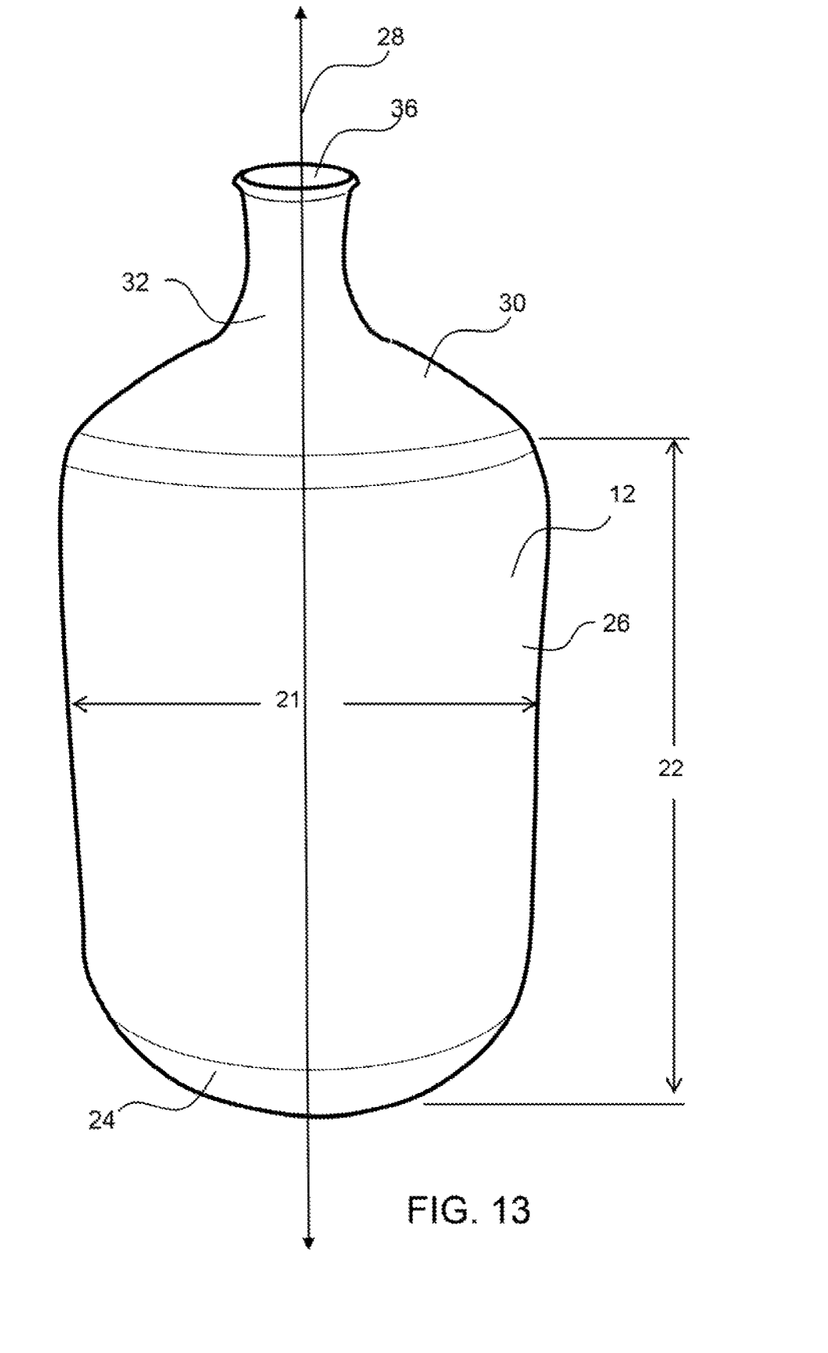
FIG. 13 shows a side perspective view of an exemplary bottle.

As shown in FIGS. 11, 12 and 13, an exemplary bottle 12 has a bottle body portion 20, a neck 32, an outer perimeter 26, a dispenser-end 30 and base-end 24. A dispenser 15 is coupled with the neck 32 and comprises a dispenser actuator 50, such as a lever or button, and a dispenser opening 56. As shown in FIG. 13, an exemplary bottle 12 has a body length 22 that extends from the base to where the bottle starts to truncate to the neck 32. The neck 32 extends to a neck opening 36 that is centrally located along the length axis 28 of the bottle. To put it another way, the neck opening is centrally located over a cross-section of the bottle. The bottle has a diameter 21 and a volume for retaining a liquid therein. As shown in FIGS. 11 and 12, a bottle cover is configured over the bottle. A first bottle cover 110 is configured over the bottle and is translucent. A second bottle cover 112 is configured over the first bottle cover and is opaque. As described herein, the second bottle cover may also be translucent. The two layers of bottle covers, the second bottle cover over the first bottle cover, may result in an opaque cover. A translucent area 114 is created by a cover window 115 or opening in the second bottle cover 112. The oval shaped translucent opening will allow a user to see the liquid within the bottle.

Figure 14:
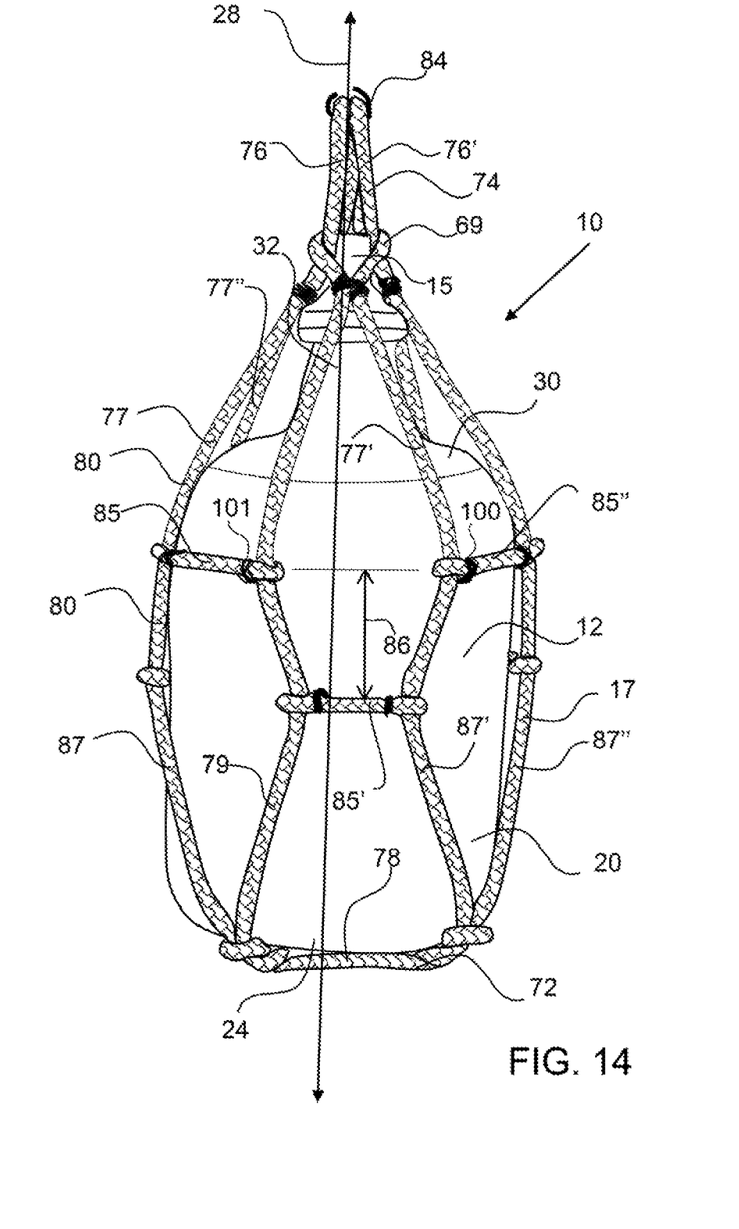
FIG. 14 shows a side view of an exemplary vortexing liquid dispenser in a transport orientation having the dispenser-end of the bottle in the hanger portion of the bottle hanger.

As shown in FIG. 14, an exemplary vortexing liquid dispenser 10 is configured with the dispenser 15 of the bottle 12 configured up and into the hanger portion 74 of the bottle hanger 17. A support 84 is coupled with the hanger loops 76, 76' to provide a convenient means to store the bottle in a hanging orientation from the support. This embodiment comprises three hanger trusses, 77-77'' formed from the six elongated support members 87. The two hanger loops 76, 76' are retained by a hanger loop noose 69 that extends over the two hanger loops to retain then for hanging the dispenser. The hanger loop noose 69 may be easily slid up and over the hanger loops to allow the bottle to be removed or re-oriented in a dispensing configuration with the neck of the bottle 32 configured down and within the dispenser crown 78 and the dispenser 15 exposed below the bottle hanger 17. In this embodiment, strut members 85, 85', for example, retain the elongated support members 87 together at an offset distance 86 along the length axis 28 of the bottle, when the bottle is retained in the bottle hanger 12. The strut members alternate from an upper location, such as strut member 85, to a lower location, such as strut member 85'. There are three upper strut member 85 and three lower strut members 85'. The strut member may be tied to the elongated support members or may be looped around the elongate support members and retained by a fastener 100, such as a wire 101 wrapped around the strut member. A clip or collar type fastener that is clamped down over looped portion of the rope and the extending portion of the rope may also be used. The lower strut member 85' pulls two of the elongated support members 87 to form one of the three dispenser trusses 79. In this embodiment, the six elongated members 87, or ropes 80 that extend from the hanger portion 74 to the dispenser retainer portion 72, form three dispenser trusses 79, and three hanger trusses 77. The support strut members and trusses alternate around the circumference of the bottle and in an exemplary embodiment are substantially equal in dimension. Elongated support members 87, 87' form a dispenser truss 79 that extends from the extended ends and attached ends of the strut member 85' down to the dispenser crown 78. Elongated support members 87' and 87'' form a hanger truss 77' that extends from the extended and attached ends of the strut member 85'' up to the hanger portion, wherein the hanger loop noose 69 extends over the other two hanger loops 76, 76'. This alternating configuration continues around the circumference of the bottle hanger, wherein there are three dispenser trusses and three hanger trusses formed from the six elongated support members that extend from the hanger portion down to the dispenser crown.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of dispensing a vortexing liquid comprising the steps of:
   a) providing a manually operated liquid vortex dispenser comprising:
      i) a bottle comprising:
         1) a body portion having a length and diameter;
         2) a length axis;
         3) a dispensing-end having a neck that extends from the body portion;
         wherein the neck extends to a neck opening that is substantially centrally located on the dispenser-end;
         4) a base-end configured opposite the neck opening;
         5) an inside surface;
         6) a volume for retaining a liquid;
      ii) a dispenser coupled to the neck opening;
      iii) a bottle hanger comprising:
         1) a plurality of elongated support members that are interconnected at attachment points;
         2) a dispenser retainer portion comprising a dispenser crown having a substantially centrally located crown opening for extending the neck of the bottle therethrough;
         3) a hanger portion configured on an opposite end of the bottle hanger from the dispenser retainer portion, and comprising:
         4) a plurality of hanger loops configured for attachment to a support;
         wherein with the bottle retained within the bottle hanger in a dispensing orientation with the neck extending through the crown opening and the bottle being hung vertically from said support, with the dispenser pointing down by the plurality of hanger loops;
   b) rotating at least one of the base-end or dispenser-end of the bottle about a vertical axis extending through a hanger location at an offset radius of rotation;
   c) creating vortexing liquid within the bottle; and
   d) opening the dispenser to dispense said vortexing liquid from the bottle.

2. The method of dispensing a vortexing liquid of claim 1, wherein the base-end of the bottle is rotated about the vertical axis of rotation while the dispenser-end is held substantially stationary.

3. The method of dispensing a vortexing liquid of claim 1, wherein the dispenser-end of the bottle is rotated about the vertical axis while the base-end is held substantially stationary.

4. The method of dispensing a vortexing liquid of claim 1, wherein the base-end of the bottle is rotated about the vertical axis at an offset radius of rotation while the dispenser-end is rotated about said vertical axis at an offset radius of rotation that is substantially smaller than that of the base-end.

5. The method of dispensing a vortexing liquid of claim 1, wherein the dispenser-end of the bottle is rotated about the vertical axis at an offset radius of rotation while the base-end is rotated about said vertical axis at an offset radius of rotation that is substantially smaller than that of the dispenser-end.

6. The method of dispensing a vortexing liquid of claim 1, further comprising the step of transporting the bottle within the bottle hanger wherein the base of the bottle is configured in the dispenser portion of the bottle hanger and the bottle secured with the bottle hanger is manually carried by the hanger loops.

7. The method of dispensing a vortexing liquid of claim 1, wherein the bottle hanger comprises at least one retaining ring that extends around the water bottle body portion.

8. The method of dispensing a vortexing liquid of claim 1, wherein a first retaining ring is configured proximal to the base-end of the bottle and a second retaining ring is configured proximal to the dispensing-end of the bottle.

9. The method of dispensing a vortexing liquid of claim 1, wherein the bottle hanger comprises six elongated support members connected by six strut members;
    wherein the strut members are configured in an alternating orientation between an upper strut member and a lower strut member around the bottle hanger;
    wherein the strut members are offset by an offset distance along the length axis of the bottle.

10. The method of dispensing a vortexing liquid of claim 9, wherein the strut members loop around an elongated support member on opposing ends and are retained by a fastener.

11. The method of dispensing a vortexing liquid of claim 1, wherein the bottle hanger consists essentially of a rope.

12. The method of dispensing a vortexing liquid of claim 1, wherein the hanger portion comprises three hanger trusses substantially equally spaced around the perimeter of the bottle when in use.

13. The method of dispensing a vortexing liquid of claim 1, wherein the dispenser retainer portion comprises three dispenser trusses substantially equally spaced around the perimeter when in use.

14. The method of dispensing a vortexing liquid of claim 1, wherein the volume of the bottle is at least 7.5 liters or more.

15. The method of dispensing a vortexing liquid of claim 1, wherein the dispenser comprises a dispenser actuator for controlling dispensing of a vortexing liquid from the bottle.

16. A method of dispensing a vortexing liquid comprising the steps of:
  a) providing a manually operated liquid vortex dispenser comprising:
    i) a bottle comprising:
      1) a body portion having a length and diameter;
      2) a length axis;
      3) a dispensing-end having a neck that extends from the body portion;
        wherein the neck extends to a neck opening that is substantially centrally located on the dispenser-end;
      4) a base-end configured opposite the neck opening;
      5) a volume for retaining a liquid;
      6) an inside surface;
    ii) a dispenser coupled to the neck opening;
    iii) a bottle hanger comprising:
      1) a plurality of elongated support members that are interconnected at attachment points;
      2) a dispenser retainer portion comprising a dispenser crown having a substantially centrally located crown opening for extending the neck of the bottle therethrough;
      3) a hanger portion configured on an opposite end of the bottle hanger from the dispenser retainer portion, and comprising:
      4) a plurality of hanger loops configured for attachment to a support;
    wherein with the bottle retained within the bottle hanger in a dispensing orientation with the neck extending through the crown opening and the bottle being hung vertically from said support, with the dispenser pointing down by the plurality of hanger loops;
  b) rotating at least one of the base-end or dispenser-end of the bottle about a vertical axis extending through a hanger location at an offset radius of rotation;
  c) creating vortexing liquid within the bottle; and
  opening the dispenser to dispense said vortexing liquid from the bottle;
wherein the base-end of the bottle is rotated about the vertical axis at an offset radius of rotation while the dispenser-end is rotated about said vertical axis at an offset radius of rotation that is substantially smaller than that of the base-end;
wherein the volume of the bottle is at least 7.5 liters or more and no more than 25 liters;
wherein the bottle hanger consists essentially of rope.

17. The method of dispensing a vortexing liquid of claim 16, wherein the rope of the bottle hanger is connected by a plurality of attachment points that consists of fasteners.

18. The method of dispensing a vortexing liquid of claim 16, wherein fasteners consists of a metal wire wrapped around the rope.

19. The method of dispensing a vortexing liquid of claim 16, wherein the bottle hanger comprises six elongated support members connected by six strut members;
    wherein the strut members are configured in an alternating orientation between an upper strut member and a lower strut member around the bottle hanger;
    wherein the strut members loop around an elongated support member on opposing ends and are retained by a fastener;
    wherein the strut members are offset by an offset distance along the length axis of the bottle.

20. The method of dispensing a vortexing liquid of claim 16, wherein at least a portion of the inside surface is coated with a polymer to render the inside surface hydrophilic.

* * * * *